(12) United States Patent
Nitsch

(10) Patent No.: US 11,570,025 B2
(45) Date of Patent: Jan. 31, 2023

(54) DIGITAL FILTER CIRCUIT AND SIGNAL PROCESSING METHOD

(71) Applicant: Rohde & Schwarz GmbH & Co. KG, Munich (DE)

(72) Inventor: Bernhard Nitsch, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/244,675

(22) Filed: Apr. 29, 2021

(65) Prior Publication Data

US 2022/0368572 A1 Nov. 17, 2022

(51) Int. Cl.
*H04L 25/03* (2006.01)

(52) U.S. Cl.
CPC .............. *H04L 25/03834* (2013.01)

(58) Field of Classification Search
CPC .... G01R 35/00; H03H 17/02; H03H 17/0261; H03H 21/00; H03M 1/06; H03M 1/08; H03M 1/10; H03M 1/12; H03M 1/88; H04B 1/10; H04B 1/40; H04B 7/00; H04L 7/00; H04L 7/033; H04L 7/03834
USPC .............. 341/118, 120, 140, 143, 150; 375/229–233, 341, 346, 350, 375; 708/313–314
See application file for complete search history.

(56) References Cited

U.S. PATENT DOCUMENTS

| | | | |
|---|---|---|---|
| 2006/0092058 A1 | 5/2006 | Slavin | |
| 2008/0130789 A1* | 6/2008 | Copeland | H04L 25/03343 375/297 |
| 2018/0254769 A1* | 9/2018 | Alic | H03H 21/0023 |
| 2019/0312571 A1* | 10/2019 | Hovakimyan | H03H 17/0261 |

OTHER PUBLICATIONS

Balla, P. C., et al., "Higher Radix Aperiodic-Convolution Algorithms," IEEE Transactions on Acoustics, Speech, and Signal Processing; ASSP-34(1):60-68, Feb. 1986.
Mou, Z.J. and P. Duhamel, "A Unified Approach to the Fast Fir Filtering Algorithms," IEEE; CNET/PAB/RPE, Issy-les-Molineaux, France, 1988, pp. 1914-1917.
Mou, Z.J. and P. Duhamel, "Short-Length FIR Filters and Their Use in Fast Nonrecursive Filtering," IEEE Transactions on Signal Processing; 39(6):1322-1332, Jun. 1991.

* cited by examiner

*Primary Examiner* — Shawkat M Ali
(74) *Attorney, Agent, or Firm* — Christensen O'Connor Johnson Kindness PLLC

(57) ABSTRACT

A digital filter circuit is described. The digital filter circuit includes at least one signal input and at least one finite impulse response (FIR) filter associated with the at least one signal input. The at least one signal input is configured to receive an input signal, wherein the input signal includes a product of at least two input signal samples. The at least one FIR filter is established as a short-length FIR filter. Further, a signal processing method is described.

20 Claims, 4 Drawing Sheets

DIGITAL FILTER CIRCUIT AND SIGNAL PROCESSING METHOD

FIELD OF THE DISCLOSURE

Embodiments of the present disclosure generally relate to a digital filter circuit. Embodiments of the present disclosure further relate to a signal processing method for processing a digital input signal.

BACKGROUND

Digital filters are known in a large variety in the state of the art. In general, digital filters are configured to process a digital signal, thereby altering the digital signal in a pre-defined manner depending on the filter coefficients of the digital filter.

In certain applications, the digital signal may comprise products of two or more signal samples. However, known digital filters may not have a sufficient processing speed in order to process such product signals at high sample rates in real time.

Thus, there is a need for a digital filter circuit as well as for a signal processing method that allow for processing product signals in real time at high sample rates.

SUMMARY

Embodiments of the present disclosure provide a digital filter circuit. In an embodiment, the digital filter circuit comprises at least one signal input and at least one finite impulse response (FIR) filter associated with the at least one signal input. The at least one signal input is configured to receive an input signal, wherein the input signal comprises a product of at least two input signal samples. In an embodiment, the at least one FIR filter is established as a short-length FIR filter.

In general, the at least one FIR filter is configured to process the at least one input signal, thereby generating an output signal.

The at least one FIR filter has a certain impulse response (i.e., certain filter coefficients) that determines how the at least one FIR filter manipulates the at least one input signal in order to generate the output signal.

The input signal is established, for example, as a product signal, i.e., the input signal comprises the product of at least two input signal samples. Therein, the two input signal samples may be taken at the same time or at different times.

It has turned out that such product signals can be processed in a particularly resource-efficient manner by short-length FIR filters. Thus, the present disclosure provides examples of a particularly resource-efficient digital filter circuit for processing product signals.

Moreover, the digital filter circuit according to some embodiments of the present disclosure is capable of processing the at least one input signal in real time, even at high sample rates up to several 10 GHz.

Generally, a short-length FIR filter is a well-known type of FIR filter. Short-length FIR filters are based on short length FIR filtering algorithms that have a reduced complexity, thereby enabling a small delay processing, for example independent on the FIR filter length. In other words, short-length FIR filters have a reduced arithmetic complexity where all multiplications are replaced by decimated sub-filters. Typically, a short-length FIR filter has a filter length that is lower than several hundred. Concerning short-length FIR filters, reference is also made to Zhi-Jian Mou and Pierre Duhamel, "Short-Length FIR Filters and Their Use in Fast Nonrecursive Filtering" in IEEE TRANSACTIONS ON SIGNAL PROCESSING, VOL. 39, NO. 6, June 1991 or Prabhakara C. Balla, Andreas Antoniou and Salvatore D. Morgera, "Higher Radix Aperiodic-Convolution Algorithms" in IEEE TRANSACTIONS ON ACOUSTICS, SPEECH, AND SIGNAL PROCESSING, VOL. ASSP-34, NO. 1, February 1986, the disclosures of which are hereby incorporated by reference in their entirety.

According to an aspect of the present disclosure, the input signal comprises a set of products of input signal samples. In general, the set of products may comprise different products, i.e., products of input signal samples taken at different times and/or with different numbers of factors. The different products may all be forwarded to a single short-length FIR filter or to different short-length FIR filters for further processing.

According to another aspect of the present disclosure, the product of the at least two input signal samples corresponds to a Volterra series diagonal. Accordingly, the digital filter circuit according to some embodiments of the present disclosure may be established as a Volterra filter circuit. The FIR filter may be configured to determine a term of the Volterra series associated with the Volterra series diagonal based on the input signal.

In general, Volterra series can be used to describe non-linear systems that are frequency-dependent and independent of a signal level. Accordingly, the digital filter circuit according to some embodiments of the present disclosure may be configured to equalize a non-linear electronic system.

In an embodiment of the present disclosure, the digital filter circuit comprises several FIR filters and several signal inputs. Each signal input is configured to receive a respective input signal comprising a product of at least two input signal samples. Each FIR filter is established as a short-length FIR filter. Accordingly, several input signals can be processed by the several FIR filters simultaneously, for example in parallel. The processing speed of the digital filter circuit is enhanced considerably due to this parallelization.

According to a further aspect of the present disclosure, each input signal comprises a product of input signal samples corresponding to a different Volterra series diagonal. Thus, each of the FIR filters may be configured to determine a different term of the Volterra series associated with the different Volterra series diagonals. Accordingly, several terms of the Volterra series can be determined by the several FIR filters simultaneously, for example in parallel. It has turned out that the corresponding Volterra series can be determined in real time due to the parallel processing by the several short-length FIR filters.

In a further embodiment of the present disclosure, a number of the FIR filters depends on at least one of a number of diagonals of the Volterra series and a maximum order of the Volterra series. In other words, the number of necessary FIR filters to determine all terms of the Volterra series in parallel depends on the number of non-zero diagonals of the Volterra series and/or on the maximum order of the Volterra series.

For example, the Volterra series may have a maximum order of three. It has turned out that a maximum order of three is sufficient to describe non-linear systems with sufficient accuracy. At the same time, restricting the maximum order to three reduces the numerical complexity and thus the necessary computing resources, i.e., the necessary number of hardware multipliers and/or the necessary number of short-length FIR filters.

The digital filter circuit may comprise one FIR filter for a first order term of the Volterra series. In other words, a single short-length FIR filter may be configured to determine the first order term of the Volterra series.

The digital filter circuit may comprise two FIR filters for a second order term of the Volterra series. In other words, two different short-length FIR filters may be configured to determine one term of the second order of the Volterra series, respectively.

The digital filter circuit may comprise four FIR filters for a third order term of the Volterra series. In other words, four different short-length FIR filters may be configured to determine one term of the third order of the Volterra series, respectively.

According to an aspect of the present disclosure, the digital filter circuit comprises a summation circuit, the summation circuit being configured to sum output signals of the FIR filters. Thus, the individual output signals of the short-length FIR filters are summed in order to generate an overall output signal of the digital filter circuit.

In some embodiments, the individual output signals of the short-length FIR filter may correspond to individual terms of a Volterra series. Accordingly, the overall output signal may correspond to the full Volterra series.

According to another aspect of the present disclosure, the at least one FIR filter comprises at least one of an FPGA or an ASIC. In other words, the short-length FIR filters are established in hardware, respectively. Thus, the processing speed of the FIR filters is considerably enhanced compared to software implementations of the FIR filters.

In a further embodiment of the present disclosure, filter coefficients of the at least one FIR filter are established such that the at least one FIR filter is configured to equalize a non-linear electronic system. In other words, filter coefficients of the at least one FIR filter may be chosen such that non-linear distortions of the at least one input signal of the digital filter circuit are compensated by the digital filter circuit.

Embodiments of the present disclosure further provide a signal processing method for processing a digital input signal. In an embodiment, the method comprises the following steps:

receiving at least one digital input signal, wherein the input signal comprises a product of at least two input signal samples; and processing the at least one input signal by at least one finite impulse response (FIR) filter, thereby obtaining an output signal;

wherein the at least one FIR filter is established as a short-length FIR filter.

Regarding the advantages and further properties of the signal processing method, reference is made to the explanations given above with respect to the digital filter circuit, which also hold for the signal processing method and vice versa.

According to an aspect of the present disclosure, the input signal comprises a set of products of input signal samples. In general, the set of products may comprise different products, i.e., products of input signal samples taken at different times and/or with different numbers of factors. The different products may all be forwarded to a single short-length FIR filter or to different short-length FIR filters for further processing.

According to another aspect of the present disclosure, the product of at least two input signal samples corresponds to a Volterra series diagonal. Accordingly, the at least one FIR filter may be part of a Volterra filter circuit. The FIR filter may determine a term of the Volterra series associated with the Volterra series diagonal based on the input signal.

In general, Volterra series can be used to describe non-linear systems that are frequency-dependent and independent of a signal level. Accordingly, a non-linear electronic system may be equalized with the signal processing method according to the present disclosure.

In an embodiment of the present disclosure, the at least one input signal is processed by a Volterra filter circuit, wherein the Volterra filter circuit comprises the at least one FIR filter. The FIR filter determine a term of the Volterra series associated with the Volterra series diagonal based on the input signal.

In a further embodiment of the present disclosure, several input signals are received and processed by means of several FIR filters, wherein each input signal comprises a product of at least two input signal samples, and wherein each FIR filter is established as a short-length FIR filter. Accordingly, several input signals can be processed by the several FIR filters simultaneously, for example in parallel. The processing speed of the signal processing method is enhanced considerably due to this parallelization.

According to an aspect of the present disclosure, output signals of the several Filters are summed in order to obtain the output signal. Thus, the individual output signals of the short-length FIR filters are summed in order to generate an overall output signal of the digital filter circuit.

In some embodiments, the individual output signals of the short-length FIR filter may correspond to individual terms of a Volterra series. Accordingly, the overall output signal may correspond to the full Volterra series.

According to a further aspect of the present disclosure, each input signal comprises a product of input signal samples corresponding to a different Volterra series diagonal. Thus, each of the FIR filters may determine a different term of the Volterra series associated with the different Volterra series diagonals. Accordingly, several terms of the Volterra series can be determined by the several FIR filters simultaneously, for example in parallel. It has turned out that the corresponding Volterra series can be determined in real time due to the parallel processing by the several short-length FIR filters.

In an embodiment of the present disclosure, the input signal corresponding to a first order of the Volterra series is processed by one FIR filter, the input signals corresponding to a second order of the Volterra series are processed by two FIR filters, and/or the input signals corresponding to a third order of the Volterra series are processed by four FIR filters.

In some embodiments, a number of the FIR filters depends on at least one of a number of diagonals of the Volterra series and a maximum order of the Volterra series. In other words, the number of necessary FIR filters to determine all terms of the Volterra series in parallel depends on the number of non-zero diagonals of the Volterra series and/or on the maximum order of the Volterra series.

In a further embodiment of the present disclosure, the at least one FIR filter comprises at least one of an FPGA or an ASIC. In other words, the short-length FIR filters are established in hardware, respectively. Thus, the processing speed of the FIR filters is considerably enhanced compared to software implementations of the FIR filters.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
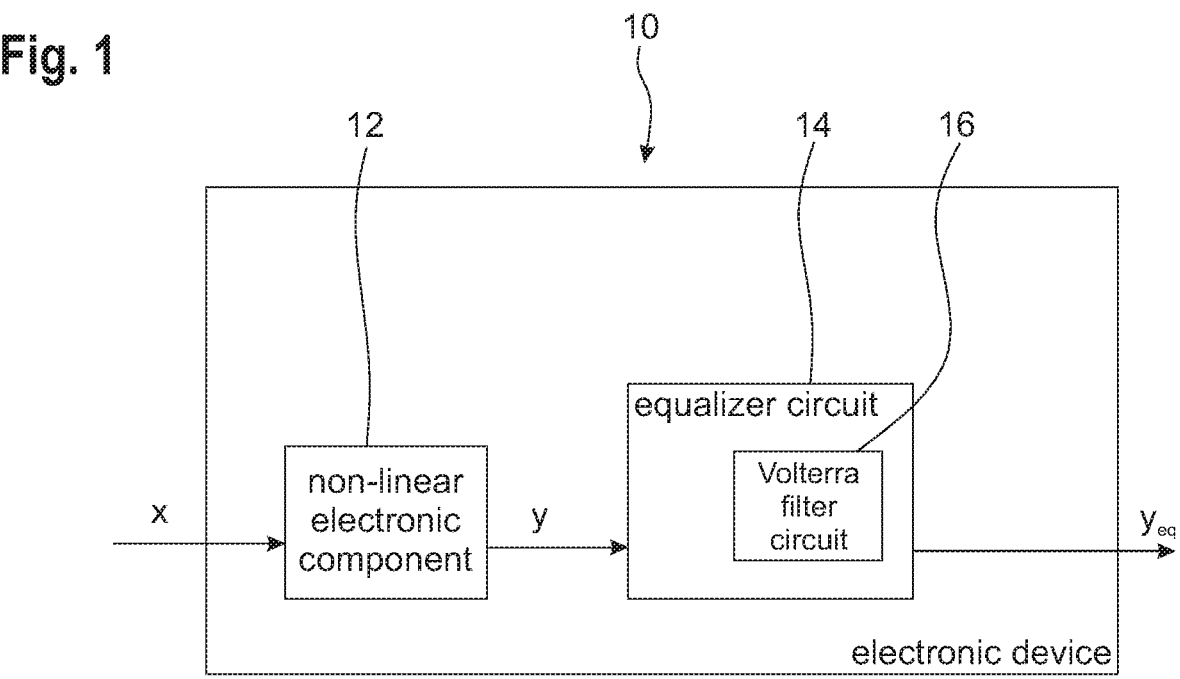
FIG. 1 schematically shows an electronic device according to a first embodiment.

FIG. 1 schematically shows an electronic device 10. The electronic device 10 comprises a non-linear electronic component 12 and an equalizer circuit or module 14.

In some embodiments, the term "module" refers to or includes, inter alia, a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

In general, the electronic device 10 may be any kind of signal-processing electronic device or signal-generating electronic device. For example, the electronic device 10 may be established as a measurement instrument, as a broad-band amplifier, as an analog-to-digital converter, as a digital-to-analog converter, or as a signal generator. In some embodiments, the electronic device 10 may be established as an oscilloscope, vector analyzer, etc.

The non-linear electronic component 12 may be any electronic component that is configured to process an input signal x, thereby generating an output signal y. For example, the non-linear electronic component 12 may be an amplifier, an analog-to-digital converter, a digital-to-analog converter, etc.

Therein, the dependence of the output signal y on the input signal x is not linear, but comprises higher order terms. Accordingly, the output signal y is a function of the input signal x and can be written as follows $$y = A \cdot x + O(x^2),$$

i.e., as a linear term plus higher order terms. Therein, $y=(y(n=0), y(n=1), \ldots)^T$ is a vector comprising the output signal samples y(n), and $x=(x(n=0), x(n=1), \ldots)^T$ is a vector comprising the input signal samples x(n).

The non-linear terms may cause unwanted distortions of the output signal y.

In order to counteract these distortions, the equalizer module 14 is configured to equalize the output signal y, e.g., pre-distort a signal processed, such that the unwanted distortions are removed from the output signal y. For this purpose, the equalizer module 14 comprises a Volterra filter circuit or module 16 with filter coefficients that are adapted to remove the unwanted perturbations from the output signal y. The functionality of the Volterra filter module 16 will be described in more detail hereinafter.

Figure 2:
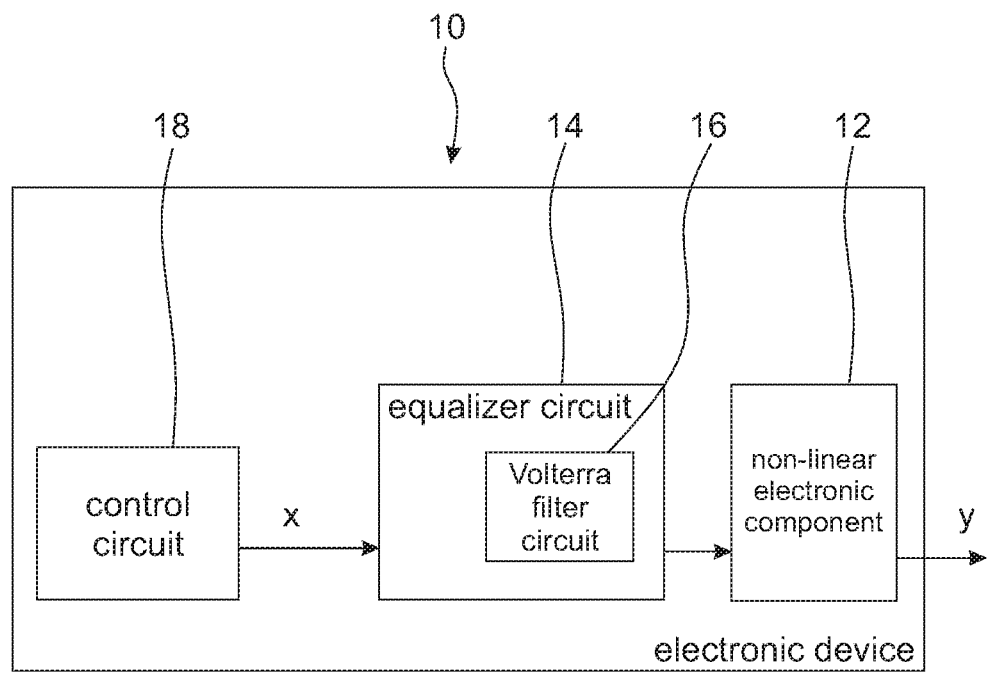
FIG. 2 schematically shows an electronic device according to a second embodiment.

FIG. 2 schematically shows a second embodiment of the electronic device 10, wherein the electronic device 10 is established as a signal generator. For example, the electronic device 10 may be established as an arbitrary signal generator. Accordingly, the non-linear electronic component 12 may be established as any component being configured to generate a predetermined output signal y or to convert a digital input signal x to an analog output signal y.

The electronic device 10 comprises a control circuit or module 18 that is configured to generate the input signal x, wherein the input signal x comprises instructions for the electronic component 12 to generate the output signal y. The equalizer module 14 may be interconnected between the control module 18 and the non-linear electronic component 12.

Accordingly, the equalizer module 14 or the Volterra filter module 16 is configured to adapt the input signal x such that the output signal y does not comprise any non-linear distortions. In other words, the Volterra filter module 16 is configured to pre-compensate, also called pre-distort, the non-linear distortions that would be caused by the non-linear electronic component 12.

Alternatively, the electronic device 10 of FIG. 2 may be established as a digital-to-analog converter. Accordingly, the equalizer module 14 or the Volterra filter module 16 is configured to adapt the digital input signal x such that the analog output signal y does not comprise any non-linear distortions. In other words, the Volterra filter module 16 is configured to pre-compensate the non-linear distortions that would be caused by the non-linear electronic component 12.

Figure 3:
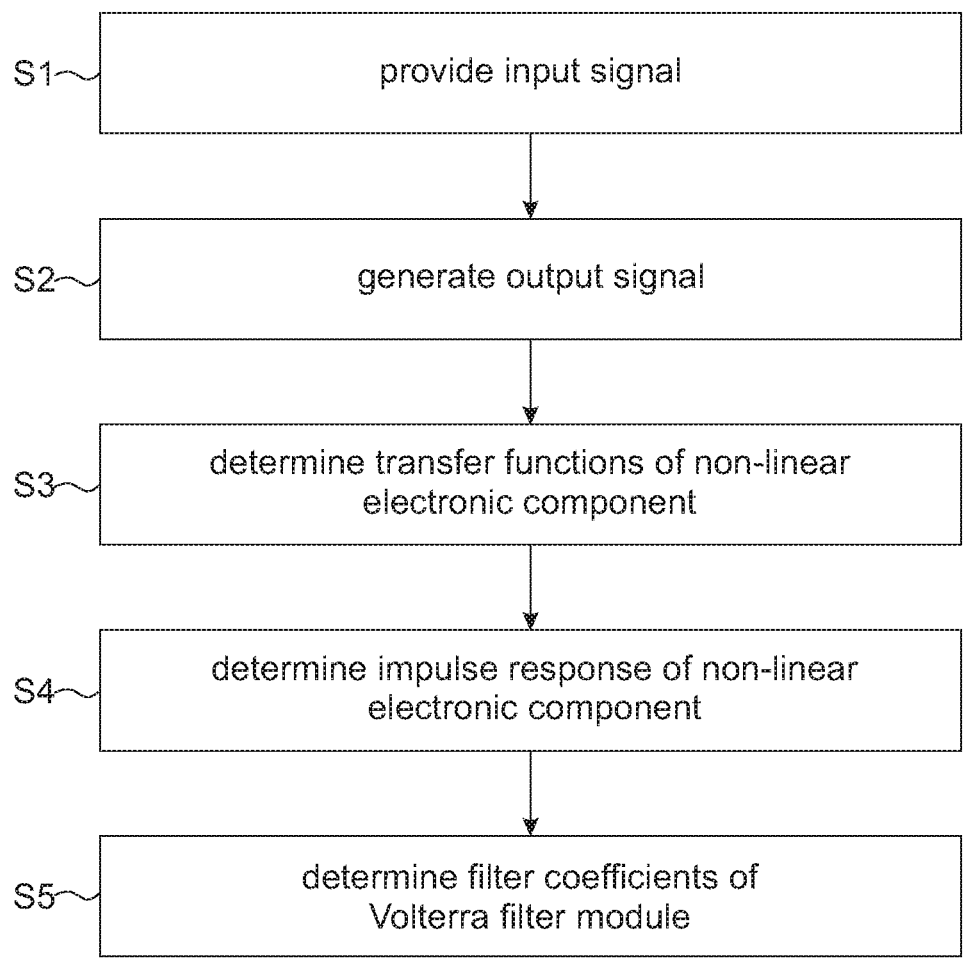
FIG. 3 shows a flowchart of a representative method for determining filter coefficients.

The equalizer module 14 should be properly calibrated, i.e., the filter coefficients of the Volterra filter module 16 need to be properly set, such that the Volterra filter module 16 correctly equalizes the output signal y. The correct filter coefficients for the Volterra filter module can be obtained by a method for determining filter coefficients of the equalizer module 14. One example of such a method is described in the following with reference to FIG. 3.

Without restriction of generality, the method is described in the following in the context of the electronic device 10 of FIG. 1. However, it is to be understood that the method can readily be adjusted for the electronic device 10 of FIG. 2.

An input signal x is provided (step S1). In general, the input signal x is a calibration signal that is used in order to calibrate the equalizer module 14. Accordingly, the input signal x may have known properties, i.e. a known spectrum, known amplitudes and/or known phases.

The input signal x may be received from an external electronic device, for example from a signal generator or from a device under test. Alternatively, the input signal x may be generated by another internal electronic component of the electronic device 10.

The input signal x is processed by the non-linear electronic component 12, thereby generating the output signal y (step S2). A first mathematical model is provided, wherein the first mathematical model describes the non-linear electronic component 12 in terms of a first Volterra series.

In general, Volterra series can be used in order to describe non-linear systems that are frequency-dependent and independent of a signal level. The output signal y can then be written in terms of the input signal x as follows:

$$y(t/T_a) = \sum_{m=1}^{M} y_m(t/T_a) = \sum_{m=1}^{M} \sum_{\mu_0=0}^{L_{m,0}-1} \cdots \sum_{\mu_{m-1}=0}^{L_{m,m-1}-1} h_m(\mu_0, \ldots, \mu_{m-1}) \cdot \prod_{\alpha=0}^{m-1} x(t/T_a - \mu_\alpha) \quad (E.1)$$

Therein, M is the maximum order of the Volterra series, $h_m(\mu_0, \ldots)$ are multi-dimensional impulse responses, and $L_{m,\mu}$ is the length of the impulse response for the dimension $\mu$ and for the order m.

In other words, the non-linear electronic component 12 can be described as a Volterra filter, and may also be called Volterra system, wherein $L_{m,\mu}$ is the length of the Volterra filter of order m for the dimension $\mu$. This interpretation will be used in the following.

The filter coefficients $h_m(t_0/T_a, \ldots, t_{m-1}/T_a)$ of the Volterra system are ambiguous, as multiple filter coefficients lead to the same product signal $$x(t_0/T_a, \ldots, t_{m-1}/T_a) = \prod_{\alpha=0}^{m-1} x(t_\alpha/T_a) \quad (E.2)$$

in equation (E.1). Therein, $T_a$ is the sampling time associated with the input signal x, i.e. $f_a=1/T_a$ is the sampling frequency of the input signal x.

For example, the filter coefficients $$\{h_2(t_0/T_a, t_1/T_a), h_2(t_1/T_a, t_0/T_a)\} \quad (E.3)$$

of a Volterra system of order m=2 yield the same product signal $x(t_0/T_a, t_1/T_a)$. Likewise, the following filter coefficients of a Volterra system of order m=3 yield the same product signal $x(t_0/T_a, t_1/T_a, t_2/T_a)$:

$$\{h_3(t_0/T_a, t_1/T_a, t_2/T_a), h_3(t_2/T_a, t_0/T_a, t_3/T_a), h_3(t_1/T_a, t_2/T_a, t_0/T_a), h_3(t_2/T_a, t_1/T_a, t_0/T_a), h_3(t_1/T_a, t_0/T_a, t_2/T_a), h_3(t_0/T_a, t_2/T_a, t_1/T_a),\} \quad (E.4)$$

Accordingly, there is a certain freedom of choice when describing the non-linear electronic component 12 in terms of the Volterra series of equation (E.1).

In some embodiments, the ambiguous filter coefficients $h_m$ may be chosen such that only one coefficient of a set of ambiguous coefficients is non-zero. Alternatively, the ambiguous filter coefficients may be chosen to be all equal to each other, such that a transfer function of the Volterra system has an additional symmetry.

The Fourier transform of equation (E.1) yields the spectrum Y of the output signal y:

$$Y(f/f_a) = \sum_{m=1}^{M} Y_m(f/f_a) = \sum_{m=1}^{M} \sum_{f_0/f_a=0}^{N-1} \cdots \sum_{f_{m-1}/f_a=0}^{N-1} H_m(f_0/f_a, \ldots, f_{m-1}/f_a) \cdot \prod_{\alpha=0}^{m-1} X(f_\alpha/f_a) \cdot \delta_1(f/f_a - f_0/f_a - \ldots - f_{m-1}/f_a) \quad (E.5)$$

Therein, $$X(f/f_a) = \sum_{t/T_a=0}^{N-1} x(t/T_a) \cdot e^{-j \cdot 2\pi \cdot t/T_a \cdot f/f_a} \quad (E.6)$$

is the spectrum of the input signal x, and $$H_m(f_0/f_a, \ldots, f_{m-1}/f_a) \sum_{t_0/T_a=0}^{N-1} \cdots \sum_{t_{m-1}/T_a=0}^{N-1} h_m(t_0/T_a, \ldots, t_{m-1}/T_a) \cdot e^{-j \cdot 2\pi \cdot (t_0/T_a \cdot f_0/f_a + \ldots + t_{m-1}/T_a \cdot f_{m-1}/f_a)} \quad (E.7)$$

is the transfer function of the Volterra system, i.e. the transfer function of the non-linear electronic component 12.

Moreover, N is the length of the Fourier transform, and $\delta_1(f/f_a)$ is a Kronecker-delta-operator, which operates with respect to its argument modulo 1:

$$\delta_1(f/f_a) = \delta(\text{mod}\{f/f_a, 1\}). \quad (E.8)$$

Transfer functions of real-valued Volterra systems have a complex conjugate symmetry:

$$H_m(-f_0/f_a, \ldots, -f_{m-1}/f_a) = H_m^*(f_0/f_a, \ldots, f_{m-1}/f_a). \quad (E.9)$$

If the impulse responses $h_m(t_0/T_a, \ldots, t_{m-1}/T_a)$ are symmetric, then transfer functions of Volterra systems of order m=2 have the additional symmetry $$H_2(f_0/f_a, f_1/f_a) = H_2(f_1/f_a, f_0/f_a). \quad (E.10)$$

while the transfer functions of Volterra systems of order m=3 have the additional symmetry $$H_3(f_0/f_a, f_1/f_a, f_2/f_a) = H_3(f_2/f_a, f_0/f_a, f_1/f_a) \quad (E.11)$$
$$= H_3(f_1/f_a, f_2/f_a, f_0/f_a) = H_3(f_2/f_a, f_1/f_a, f_0/f_a)$$
$$= H_3(f_1/f_a, f_0/f_a, f_2/f_a) = H_3(f_0/f_a, f_2/f_a, f_1/f_a)$$

In other words, the transfer functions are equal to each other at points where the individual frequencies $f_\mu/f_a$ are interchanged arbitrarily.

From equation (E.5) it can be seen that the sampling rate $f_a$ associated with the input signal x is sufficient to characterize the non-linear electronic component 12 as a Volterra system. Accordingly, the sampling rate does not need to be enhanced, e.g., via an interpolation.

If the input signal x is established as a multi-frequency signal comprising a number $N_T$ of different signal components having different predefined frequencies $f_\mu/f_a$, amplitudes $A_\mu$ and phases $\phi_\mu$, the input signal can be written as $$X(f/f_a) = \sum_{\mu=0}^{N_T-1} A_\mu \cdot e^{j\phi_\mu} \cdot [\delta_1(f/f_a - f_\mu/f_a) + \delta_1(f/f_a + f_\mu/f_a)] \quad \text{(E. 12)}$$

In this case, the output signal spectrum Y is given by $$Y_m(f/f_a) = \sum_{\mu_0=0}^{N_T-1} \cdots \sum_{\mu_{m-1}=0}^{N_T-1} H_m\left(\frac{f_{\mu_0}}{f_a}, \ldots, \frac{f_{\mu_{m-1}}}{f_a}\right) \cdot \quad \text{(E. 13)}$$

$$\prod_{\alpha=0}^{m-1} A_{\mu_\alpha} \cdot e^{j\sum_{\alpha=1}^{m} \phi_{\mu_\alpha}} \cdot \left[\delta_1\left(\frac{f}{f_a} - \sum_{\alpha=0}^{m-1} \frac{f_{\mu_\alpha}}{f_a}\right) + \delta_1\left(\frac{f}{f_a} + \sum_{\alpha=0}^{m-1} \frac{f_{\mu_\alpha}}{f_a}\right)\right].$$

It is noted that the multi-dimensional impulse responses of some Volterra systems, for example of low-noise amplifiers, are weakly occupied, i.e., most of the components of the multi-dimensional impulse responses are equal to zero.

If only filter coefficients of the main diagonal of the impulse responses are non-zero, the Volterra series may also be called a "memory polynomial". If only few diagonals of the impulse responses are non-zero, the Volterra series may also be called an "extended memory polynomial":

$$y(t/T_a) = \sum_{m=1}^{M} y_m(/T_a) = \sum_{m=1}^{M} \sum_{\mu_0=0}^{L-1} \sum_{\mu_1=\mu_0-D_{m,1}}^{\mu_0+D_{m,1}} \cdots \quad \text{(E. 14)}$$

$$\sum_{\mu_{m-1}=\mu_0-D_{m-1,m-1}}^{\mu_0+D_{m-1,m-1}} h_m(\mu_0, \ldots, \mu_{m-1}) \cdot \prod_{\alpha=0}^{m-1} x(t/T_a - \mu_\alpha).$$

Therein, the term $2D_{m,\mu}+1$ describes the number of diagonals of the impulse response of the Volterra system of order m with respect to dimension p.

Based on the input signal x, the output signal y, and the first Volterra series, impulse responses and/or transfer functions of the non-linear electronic component 12 are determined (step S3).

In the following, two different embodiments are described with respect to the input signal that both allow for determining the impulse responses and/or transfer functions of the non-linear electronic component 12. It has turned out that restricting the analysis to the order M=3 is sufficient in both embodiments.

According to a first embodiment, the input signal x may be established as a broad-band noise signal.

Equation (E.1) can be rewritten in a matrix-vector-notation as follows:

$$\underline{y}(t/T_a) = \underline{\underline{X}}(t/T_a) \cdot \underline{h}. \quad \text{(E.15)}$$

The vector $$\underline{h} = [h_1(0), \ldots, h_1(L_1-1), h_2(0,0), \ldots, h_2(L_{2,0}-1, L_{2,1}-1)h_2(0,0,0), \ldots, h_3(L_{3,0}-1, L_{3,1}-1, L_{3,2}-1)]^T \quad \text{(E.16)}$$

comprises all filter coefficients of the impulse responses of order m=1, 2, 3, wherein only one filter coefficient of each set of ambiguous filter coefficients is taken into account.

The matrix $$\underline{\underline{X}}(t/T_a) = \begin{bmatrix} \underline{x}^T(t/T_a) \\ \vdots \\ \underline{x}^T(t/T_a - N+1) \end{bmatrix} \quad \text{(E. 17)}$$

comprises vectors $$\underline{x}(t/T_a) = [x(t/T_a), \ldots, x(t/T_a - L_1 - 1), x(t/T_a) \cdot x(t/T_a), \ldots, x(t/T_a - L_{2,0}+1) \cdot x(t/T_a - L_{2,1}+1), x(t/T_a) \cdot x(t/T_a) \cdot x(t/T_a), \ldots, x(t/T_a - L_{3,0}+1) \cdot x(t/T_a - L_{3,1}+1) \cdot x(t/T_a - L_{3,0}+1)]^T. \quad \text{(E.18)}$$

that comprise the corresponding product signals of the filter coefficients. The vector $$\underline{y}(t/T_a) = [y(t/T_a), \ldots, y(t/T_a - N+1)]^T \quad \text{(E.19)}$$

comprises the sample points of the output signal y of the non-linear electronic component 12.

In order to determine the impulse responses and/or transfer functions of the non-linear electronic component 12, a cost functional K is provided, wherein the cost functional K describes a mean error signal power:

$$K = \overline{e^2}(t/T_a) = [\underline{\underline{X}}(t/T_a) \cdot \underline{h} - \underline{y}(t/T_a)]^T \cdot [\underline{\underline{X}}(t/T_a) \cdot \underline{h} - \underline{y}(t/T_a)]. \quad \text{(E.20)}$$

The cost functional is minimized by the following choice of filter coefficients:

$$\underline{h} = [\underline{\underline{X}}^T(t/T_a) \cdot \underline{\underline{X}}(t/T_a)]^{-1} \cdot [\underline{\underline{X}}^T(t/T_a) \cdot \underline{y}(t/T_a)] \quad \text{(E.21)}$$

It is noted that the correlation matrix $$\underline{\underline{C}}(t/T_a) = [\underline{\underline{X}}^T(t/T_a) \cdot \underline{\underline{X}}(t/T_a)] \quad \text{(E.22)}$$

needs to be inverted in order to determine the filter coefficients according to equation (E.21).

A broad-band noise signal comprises a lot of different frequencies. As can be seen in equation (E.13), several different signal components having different frequencies contribute to the same output signal frequency. In other words, there is a superposition of contributions from different input signal frequencies contributing to the same output signal frequency.

Such superpositions can occur within the same order m of the Volterra system and/or across different orders m of the Volterra system.

For example, within the order m=2, all frequencies $\{-f_{in}/f_a, +f_{in}/f_a\}$ always superpose to give an output frequency of zero. Within the order m=3, the input frequencies $\{-f_{in,0}/f_a, +f_{in,0}/f_a, +f_{in,1}/f_a\}$ always yield an output frequency $f_{out}/f_a = f_{in,1}/f_a$.

An example for such superpositions between different orders are input frequencies {0.15, 0.15} for m=2 and {0.1, 0.1, 0.1} for m=3, which both yield an output frequency of $f_{out}/f_a = 0.3$.

Thus, using a broad-band noise signal as input signal x leads to a systematically overdetermined computation problem.

It has turned out that that the correlation matrix defined in equation (E.22) has a rather high condition, i.e., a high amplification factor of errors, which further complicates the matrix inversion.

Moreover, the correlation matrix comprises expectation values of higher order, namely $$r_x^o(T_0/T_a, T_1/T_a, \ldots, T_{o-1}/T_a) = E\left\{\prod_{\mu=0}^{o-1} x(t/T_a - T_\mu/T_a)\right\}. \quad \text{(E. 23)}$$

More precisely, depending on the maximum order M of the Volterra system, the correlation matrix comprises expectation values of the orders $$o = \{2, 3, \ldots, 2M\} \quad \text{(E.24)}$$

These problems can be counteracted by enhancing the numeric precision for the matrix inversion and/or by enhancing the observation length N for determining the correlation matrix. However, this may considerably increase the necessary computation time.

According to a second embodiment, the input signal x may be established as a multi-frequency signal comprising a pre-defined number $N_T$ of signal components having different frequencies.

The output signal of the Volterra system then comprises spectral components having output frequencies $$f_{out,\alpha}/f_a = \text{mod}\left\{\sum_{\mu=0}^{m-1} f_{in,\mu,\alpha}/f_a, 1\right\}, \quad \text{(E. 25)}$$

which are generated by groups of m input frequencies $\{f_{in,0,\alpha}/f_a, \ldots, f_{in,m-1,\alpha}/f_a\}$, wherein frequencies within a group $\alpha$ may be partially or completely the same.

If the amplitudes and phases of the input signal x are known and the amplitudes and phases of the output signal y are determined, the transfer functions $H_m(\{f_{in,0,\alpha}/f_a, \ldots, f_{in,m-1,\alpha}/f_a\})$ can be determined at the spectral positions $\{f_{in,0,\alpha}/f_a, \ldots, f_{in,m-1,\alpha}/f_a\}$ of the frequency group $\alpha$.

As described above in the context of the input signal being established as a broad-band noise signal, different groups of input frequencies can contribute to the same output frequency.

Accordingly, several contributions associated with different transfer functions superpose, and the transfer functions may not be determinable at these spectral positions.

It has turned out that there are different classes of such ambiguities, namely the ambiguities originate within a single order m of the Volterra system;

the ambiguities originate across different orders m of the Volterra system;

the ambiguities are systematic, i.e., they cannot be avoided by choosing another set of input frequencies; and the ambiguities are non-systematic, i.e., they can be avoided by choosing another set of input frequencies.

Accordingly, the input frequencies of the input signal x are chosen such that only the systematic ambiguities remain and there are no non-systematic ambiguities. The correct input frequencies can, for example, be found by solving a corresponding optimization problem with an intelligent search technique.

It is noted that in order to fully characterize a Volterra system of maximum order M=3, a minimum number $N_T$=3 of different signal components having different frequencies is required.

The transfer functions $H_m$ of the Volterra system (i.e. of the non-linear electronic component 12)

$$H_m\left(\frac{f_0}{f_a}, \ldots, \frac{f_{m-1}}{f_a}\right) = \frac{c(m)}{N_{comb}(m, f_0/f_a, \ldots, f_{m-1}/f_a)} \cdot \quad \text{(E. 26)}$$

$$\frac{A_{out}(f_{out}/f_a)}{\prod_{\mu=0}^{m-1} A_{in}(f_\mu/f_a)} \cdot e^{j \cdot \phi_{out}(f_{out}/f_a) - j \cdot \sum_{\mu=0}^{m-1} \phi_{in}(f_\mu/f_a)}$$

at the spectral positions $\{f_0/f_a, \ldots, f_{m-1}/f_a\}$ depend on the amplitude $A_{out}(f_{out}/f_a)$ and the phase $\phi_{out}(f_{out}/f_a)$ of the output signal that are associated with the input frequencies $\{f_0/f_a, \ldots, f_{m-1}/f_a\}$.

Moreover, the transfer functions $H_m$ depend on the amplitudes $A_{in}(f_\mu/f_a)$ and the phases $\phi_{in}(f_\mu/f_a)$ of the components of the input signal x.

In equation (E.26), the factor c(m) is a scaling factor that depends on the order m, wherein c(1)=1, c(2)=2, and c(3)=4.

The factor $N_{comb}$ is a combinatorial factor, wherein:

$N_{comb}(m=1)=1$;

$N_{comb}(m=2, f_0/f_a, f_1/f_a)$ is equal to 1 if $f_0=f_1$ and is equal to 2 otherwise; and $N_{comb}(m=3, f_0/f_a, f_1/f_a, f_2/f_a)$ is equal to 1 if all frequencies are identical, equal to 3 if two frequencies are identical, and equal to 6 if all frequencies are different from each other.

It has turned out that the transfer functions $H_m$ determined according to equation (E.26) are symmetric, and the associated impulse responses $h_m$ are axisymmetric.

Put differently, the transfer functions $H_m$ are sampled with the multi-frequency input signal x.

In some embodiments, the individual signal components of the input signal x are non-equidistant in frequency domain, i.e. the value of $f_i - f_j$ is different for each pair of frequencies $f_i$, $f_j$ of the input signal.

In order to determine the transfer functions $H_m$ according to equation (E.26), the amplitudes $A_\mu$ and phases $\phi_\mu$ of the output signal y have to be determined.

The output signal y can be written as $$y(t/T_a) = \sum_{\mu=0}^{N_{T-1}} A_\mu \cdot \sin(2\pi \cdot f_\mu/f_a \cdot t/T_a + \phi_\mu) = \quad \text{(E. 27)}$$

$$\sum_{\mu=0}^{N_{T-1}} C_\mu \cdot \sin(2\pi \cdot f_\mu/f_a \cdot t/T_a) + D_\mu \cdot \cos(2\pi \cdot f_\mu/f_a \cdot t/T_a)$$

Equation (E.27) can be re-written in matrix-vector-notation as follows:

$$\underline{y}(t/T_a) = \underline{X}(t/T_a) \cdot \underline{h}. \quad \text{(E.28)}$$

The vector $$\underline{h} = [C_0, D_0, C_1, D_1, \ldots, C_{N_T-1}, D_{N_T-1}]^T \quad \text{(E.29)}$$

comprises all amplitudes of the sine terms and of the cosine terms in equation (E.27). The matrix $$\underline{X}(t/T_a) = \begin{bmatrix} \underline{x}^T(t/T_a) \\ \vdots \\ \underline{x}^T(t/T_a - N + 1) \end{bmatrix} \quad \text{(E. 30)}$$

comprises the vectors $$\underline{x}(t/T_a) = [\sin(2\pi \cdot f_0/f_a \cdot t/T_a), \cos(2\pi \cdot f_0/f_a \cdot t/T_a), \ldots, \sin(2\pi \cdot f_{N_T-1}/f_a \cdot t/T_a), \cos(2\pi \cdot f_{N_T-1}/f_a \cdot t/T_a)]^T. \quad \text{(E.31)}$$

which comprise the sample points associated with the sine terms and the cosine terms. N is the number of samples that is used for determining the amplitudes and phases.

The vector $$\underline{y}(t/T_a) = [y(t/T_a), \ldots, y(t/T_a - N+1)]^T \quad \text{(E.32)}$$

comprises the samples of the output signal y.

In order to determine the amplitudes $C_\mu$ and $D_\mu$, a cost functional K is provided, wherein the cost functional K describes a mean error signal power:

$$K = \overline{e}^2(t/T_a) = [\underline{X}(t/T_a) \cdot \underline{h} - \underline{y}(t/T_a)]^T \cdot [\underline{X}(t/T_a) \cdot \underline{h} - \underline{y}(t/T_a)]. \quad \text{(E. 34)}$$

The cost functional is minimized by the following amplitude vector:

$$\underline{h} = [\underline{X}^T(t/T_a) \cdot \underline{X}(t/T_a)]^{-1} \cdot [\underline{X}^T(t/T_a) \cdot \underline{y}(t/T_a)] \quad \text{(E. 34)}$$

The inverse of the correlation matrix $$\underline{X}^T(t/T_a) \cdot \underline{X}(t/T_a) \quad \text{(E.35)}$$

can be determined a priori, and may be saved in a memory for later usage.

The phases $\phi_\mu$ can then be determined from the equation $$\phi_\mu = a\tan(D_\mu, C_\mu) \quad \text{(E.36)}$$

The amplitudes $A_\mu$ can then be determined according to the equation $$A_\mu = C_\mu / \sin(\phi_\mu) \quad \text{(E.37)}$$

There are two special cases at $f/f_a = 0$ and $f/f_a = -\frac{1}{2}$. In these cases, only the amplitude $A_\mu$ has to be determined. Thus, in these cases the parameter $D_\mu$ has to be set to zero in equations (E.27) and (E.29).

Optionally, the impulse responses $h_m$ of the non-linear electronic component 12 may be determined based on the determined transfer functions $H_m$ (step S4).

Equation (E.7) can be reformulated in matrix-vector notation as follows:

$$\underline{y} = \underline{X} \cdot \underline{h}. \quad \text{(E. 38)}$$

The vector $$\underline{h} = [h_m(0, \ldots, 0), \ldots, h_m(L_m-1, \ldots, L_m-1)]^T \quad \text{(E.39)}$$

comprises all impulse responses of the non-linear electronic component 12 (the impulse responses may also be called filter coefficients of the Volterra system representing the non-linear electronic component 12). The reference vector $$\underline{y} = [H_m(f_0/f_a, \ldots, f_0/f_a), \ldots, H_m(f_{N-1}/f_a, \ldots, f_{N-1}/f_a)]^T \quad \text{(E. 40)}$$

comprises the transfer functions $H_m$ of the non-linear electronic component 12, i.e. of the Volterra system. The matrix $$X = \begin{bmatrix} \underline{x}^T(f_0/f_a, \ldots, f_0/f_a) \\ \vdots \\ \underline{x}^T(f_{N-1}/f_a, \ldots, f_{N-1}/f_a) \end{bmatrix} \quad \text{(E. 41)}$$

comprises vectors $$\underline{x}(f_0/f_a, \ldots, f_{m-1}/f_a) = \quad \text{(E. 42)}$$
$$[e^{-j \cdot 2\pi \cdot [f_0/f_a \cdot 0 + \ldots + f_{m-1}/f_a \cdot 0]}, \ldots, e^{-j \cdot 2\pi \cdot [f_0/f_a \cdot (L_m-1) + \ldots + f_{m-1}/f_a \cdot (L_m-1)]}]^T,$$

that comprise the exponential functions of the respective Fourier transforms.

The following cost functional K is provided, wherein the cost functional K describes a mean spectral error signal power:

$$K = \overline{E}^2 = [\underline{X} \cdot \underline{h} - \underline{y}]^T \cdot \text{diag}\{\underline{W}\} \cdot [\underline{X} \cdot \underline{h} - \underline{y}]. \quad \text{(E. 43)}$$

Therein, the vector $$\underline{W} = [W(f_0/f_a, \ldots, f_0/f_a), \ldots, W(f_{N-1}/f_a, \ldots, f_{N-1}/f_a)]^T \quad \text{(E.44)}$$

is a spectral weighting function. Via the spectral weighting function, the spectral quality of the Volterra system can be controlled.

The cost functional K is minimized by the following filter coefficients (i.e. impulse responses) of the Volterra system:

$$\underline{h} = [\text{diag}\{\underline{W}\} \cdot \underline{X}^T \cdot \underline{X}]^{-1} \cdot [\text{diag}\{\underline{W}\} \cdot \underline{X}^T \cdot \underline{y}] \quad \text{(E. 45)}$$

It has turned out that the minimization problem defined by equations (E.38) to (E.45) is not ambiguous, and that the correlation matrix $$\text{diag}\{\underline{W}\} \cdot \underline{X}^T \cdot \underline{X} \quad \text{(E.46)}$$

only has a small or moderate condition.

The inverse of the correlation matrix can be determined a priori, and may be saved in a memory for later usage.

The transfer functions $H_m$ do not have to be sampled in an equidistant manner. However, the maximum frequency distance puts an upper boundary on the length $L_m$ of the impulse response $h_m(t_0/T_a, \ldots, t_{m-1}/T_a)$:

$$L_m \leq \frac{1}{\max_{\mu,\nu}\{|f_\mu/f_a - f_\nu/f_a|\}} \quad \text{(E. 47)}$$

It is noted that the minimization technique described in equations (E.38) to (E.47) can also be used for memory polynomials or otherwise pruned Volterra series. In that case, the impulse responses that are equal to zero have to be deleted from equation (E.39).

Filter coefficients of the Volterra filter module 16 are determined based on the determined transfer functions $H_m$ of the non-linear electronic component 12 (step S5).

In some embodiments, the filter coefficients of the Volterra filter module 16 are determined by a Pth order inverse technique, as will be described in more detail below.

In general, the Volterra filter module 16 is described by a second mathematical model, more precisely by a second Volterra series, analogously to equation (E.1).

First, the Pth order inverse technique will be described in time domain.

The filter coefficients $h_{eq,1}$ of order m=1 of the Volterra filter module 16 are defined by the following equation:

$$y(k) = \sum_{\mu_0} h_{eq,1}(\mu_0) \cdot \sum_{\alpha_0} h_1(\alpha_0) \cdot x(k - \mu_0 - \alpha_0) = x(k). \quad \text{(E. 48)}$$

Therein, $h_m(k_0, k_1, \ldots, k_{m-1})$ are the impulse responses of the Volterra system (i.e. of the non-linear electronic system 12) that have already been determined, while $h_{eq,m}$ are the desired impulse responses, i.e. the filter coefficients of the Volterra filter module 16.

In order for the output signal y(k) of the equalizer module 14 to be equal to the input signal x(k) of the non-linear electronic component 12, the condition $$\sum_{\mu_0} h_{eq,1}(\mu_0) \cdot h_1(-\mu_0) = 1 \quad \text{(E. 49)}$$

has to be fulfilled for $\mu_0 + \alpha_0 = 0$, while the condition $$\sum_{\mu_0} h_{eq,1}(\mu_0) \cdot h_1(D - \mu_0) = 0 \quad \text{(E. 50)}$$

has to be fulfilled for $\mu_0 + \alpha_0 = D \neq 0$. Equations (E.49) and (E.50) define a system of equations that can be solved by a minimum square error technique.

For the second order, i.e. m=2, the following condition has to be fulfilled:

$$\sum_{\mu_0} \sum_{\mu_1} h_{eq,2}(\mu_0, \mu_1) \cdot x(k - \mu_0) \cdot x(k - \mu_1) = -\sum_{\alpha_0} h_{eq,1}(\alpha_0) \quad \text{(E. 51)}$$

$$\sum_{\beta_0} \sum_{\beta_1} h_2(\beta_0, \beta_1) \cdot \left[ \sum_{\gamma_0} h_{eq,1}(\gamma_0) \cdot x(k - \alpha_0 - \beta_0 - \gamma_0) \right] \cdot$$

$$\left[ \sum_{\gamma_1} h_{eq,1}(\gamma_1) \cdot x(k - \alpha_0 - \beta_1 - \gamma_1) \right].$$

This leads to the following expression for the second order filter coefficients of the Volterra filter module 16:

$$h_{eq,2}(\mu_0, \mu_1) = -\sum_{\alpha_0} h_{eq,1}(\alpha_0) \cdot \quad \text{(E. 52)}$$

$$\sum_{\beta_0} \sum_{\beta_1} h_2(\beta_0, \beta_1) \cdot h_{eq,1}(\mu_0 - \alpha_0 - \beta_0) \cdot h_{eq,1}(\mu_1 - \alpha_0 - \beta_1).$$

For the third order, i.e. m=3, the condition is that there should be no distortions of order m=3 at the output of the Volterra filter module 16. In a shortened notation, this condition can be expressed as $$Q_3 = K_1 H_3 + K_2[H_1 + H_2] - K_2 H_1 - K_2 H_2 + K_3 H_1 = 0 \quad \text{(E.53)}$$

wherein $K_m$ represents the Volterra filter module 16 at order m, and wherein $H_m$ represents the Volterra system (i.e. the non-linear electronic component 12) at order m.

$K_1$ and $K_2$ have already been determined above, cf. equations (E.50) and (E.52).

The third order contribution of the Volterra filter module 16 is then given by $$K_3 = -K_1 H_3 K_1 - K_2[H_1 + H_2]K_1 + K_2 H_1 K_1 + K_2 H_2 K_1 \quad \text{(E. 54)}$$

$$= -K_1 H_3 K_1 - K_2[H_1 + H_2]K_1 + K_2 + K_2 H_2 K_1$$

$$= T_{(1)} + T_{(2)} + T_{(3)} + T_{(4)}.$$

In the following, the explicit expressions for the terms $T_{(\mu)}$ are given:

$$T_{(1)} = -\sum_{\alpha_0} h_{eq,1(\alpha_0)} \cdot \sum_{\beta_0} \sum_{\beta_1} \sum_{\beta_2} h_3(\beta_0, \beta_1, \quad \text{(E. 55)}$$

$$\beta_2) \cdot \left[ \sum_{\gamma_0} h_{eq,1}(\gamma_0) \cdot x(k - \alpha_0 - \beta_0 - \gamma_0) \right] \cdot \left[ \sum_{\gamma_1} h_{eq,1}(\gamma_1) \cdot \right.$$

$$\left. x(k - \alpha_0 - \beta_1 - \gamma_1) \right] \cdot \left[ \sum_{\gamma_2} h_{eq,1}(\gamma_2) \cdot x(k - \alpha_0 - \beta_2 - \gamma_2) \right],$$

$$T_{(2)} = -\sum_{\alpha_0} \sum_{\alpha_1} h_{eq,2}(\alpha_0, \alpha_1) \cdot [x(k - \alpha_0) + T_{(5)}] \cdot [x(k - \alpha_1) + T_{(6)}]$$

$$T_{(5)} = \sum_{\beta_0} \sum_{\beta_1} h_2(\beta_0,$$

$$\beta_1) \cdot \left[ \sum_{\gamma_0} h_{eq,1}(\gamma_0) \cdot x(k - \alpha_0 - \beta_0 - \gamma_0) \right] \cdot \left[ \sum_{\gamma_1} h_{eq,1}(\gamma_0) \cdot x(k - \alpha_0 - \beta_1 - \gamma_1) \right]$$

$$T_{(6)} = \sum_{\beta_2} \sum_{\beta_3} h_2(\beta_2,$$

$$\beta_3) \cdot \left[ \sum_{\gamma_2} h_{eq,1}(\gamma_2) \cdot x(k - \alpha_1 - \beta_2 - \gamma_2) \right] \cdot \left[ \sum_{\gamma_3} h_{eq,1}(\gamma_0) \cdot x(k - \alpha_1 - \beta_3 - \gamma_3) \right]$$

$$T_{(3)} = +\sum_{\alpha_0} \sum_{\alpha_1} h_{eq,2}(\alpha_0, \alpha_1) \cdot x(k - \alpha_0) \cdot x(k - \alpha_1) v$$

$$T_{(4)} = +\sum_{\alpha_0} \sum_{\alpha_1} h_{eq,2}$$

$$(\alpha_0, \alpha_1) \cdot \left[ \sum_{\beta_0} \sum_{\beta_1} h_2(\beta_0, \beta_1) \cdot \left\{ \sum_{\gamma_0} h_{eq,1}(\gamma_0) \cdot x(k - \alpha_0 - \beta_0 - \gamma_0) \right\} \cdot \right.$$

$$\left\{ \sum_{\gamma_1} h_{eq,1}(\gamma_1) \cdot x(k - \alpha_0 - \beta_1 - \gamma_1) \right\} \right] \cdot \left[ \sum_{\beta_2} \sum_{\beta_3} h_2(\beta_2, \beta_3) \cdot \right.$$

$$\left. \left\{ \sum_{\gamma_2} h_{eq,1}(\gamma_0) \cdot x(k - \alpha_1 - \beta_2 - \gamma_2) \right\} \cdot \left\{ \sum_{\gamma_3} h_{eq,1}(\gamma_3) \cdot x(k - \alpha_1 - \beta_3 - \gamma_3) \right\} \right]$$

For the calculation of the impulse response $h_{eq,3}$ of the third order of the Volterra filter module 16, only product signals $x(k_0) \cdot x(k_1) \cdot x(k_2)$ with three sample values may contribute. It has turned out that terms that do not meet this condition completely cancel each other.

Accordingly, it holds $$-\sum_{\alpha_0}\sum_{\alpha_1}h_{eq,2}(\alpha_0,\alpha_1)\cdot T_{(5)}\cdot T_{(6)}= \quad\text{(E. 56)}$$

$$-T_{(4)}-\sum_{\alpha_0}\sum_{\alpha_1}h_{eq,2}(a_0,\alpha_1)\cdot x(k-\alpha_0)\cdot x(k-\alpha_1)=-T_{(3)}.$$

The result for the third order filter coefficients of the Volterra filter module 16 has two contributions, namely $h_{eq,3}^{(1)}$ and $h_{eq,3}^{(2)}$ which are given by $$h_{eq,3}^{(1)}(\mu_0,\mu_1,\mu_2)= \quad\text{(E. 57)}$$

$$-\sum_{\alpha_0}h_{eq,1}(\alpha_0)\cdot\sum_{\beta_0}\sum_{\beta_1}\sum_{\beta_2}h_3(\beta_0,\beta_1,\beta_2)\cdot h_{eq,1}(\mu_0-\alpha_0-\beta_0)\cdot$$

$$h_{eq,1}(\mu_1-\alpha_0-\beta_1)\cdot h_{eq,1}(\mu_2-\alpha_0-\beta_2)$$

$$h_{eq,3}^{(2)}(\mu_0,\mu_1,\mu_2)=-\sum_{\alpha_1}^{L_{eq,1}}h_{eq,2}(\mu_0,\alpha_1)\cdot$$

$$\sum_{\beta_2}\sum_{\beta_3}h_2(\beta_2,\beta_3)\cdot h_{eq,1}(\mu_1-\alpha_1-\beta_2)\cdot h_{eq,1}(\mu_2-\alpha_1-\beta_3)-\sum_{\alpha_0}^{L_{eq,1}-1}h_{eq,2}$$

$$(\alpha_0,\mu_2)\cdot\sum_{\beta_0}\sum_{\beta_1}h_2(\beta_0,\beta_1)\cdot h_{eq,1}(\mu_0-\alpha_0-\beta_0)\cdot h_{eq,1}(\mu_1-\alpha_0-\beta_1).$$

The third order filter coefficients of the Volterra filter module 16 are then given by $$h_{eq,3}(\mu_0,\mu_1,\mu_2)=h_{eq,3}^{(1)}(\mu_0,\mu_1,\mu_2)+h_{eq,3}^{(2)}(\mu_0,\mu_1,\mu_2) \quad\text{(E. 58)}$$

With the same technique, filter coefficients $h_{eq,m}(k_0, k_1, k_2)$ of extended memory polynomials or pruned impulse responses can be determined. In this case, only sample times lying on the diagonals of the impulse responses $h_{eq,m}(k_0, k_1, k_2)$ are considered.

The determined impulse responses $h_{eq,m}(k_0, k_1, k_2)$ may not be the final filter coefficients for the Volterra filter module 16. Instead, the determined impulse responses $h_{eq,m}(k_0, k_1, k_2)$ may serve as reference impulse responses $h_{eq,ref,m}(k_0, k_1, k_2)$ for determining the final filter coefficients of the Volterra filter module 16, as will be described in more detail below.

Alternatively to the time-domain technique described above, the filter coefficients of the Volterra filter module 16 can also be determined by a Pth order inverse technique in frequency domain.

First, equation (E.5) is formulated for the maximum order M=3, and the innermost summation is performed, resulting in $$Y(f/f_a)=H_1(f/f_a)\cdot X(f/f_a)+$$

$$\sum_{\alpha=0}^{N-1}H_2(\alpha,f/f_a-\alpha\text{ mod }1)\cdot X(\alpha)\cdot X(f/f_a-\alpha\text{ mod }1)+$$

-continued $$\sum_{\beta_0=0}^{N-1}\sum_{\beta_1=0}^{N-1}H_3(\beta_0,\beta_1,f/f_a-\beta_0-\beta_1\text{ mod }1)\cdot$$

$$X(\beta_0)\cdot X(\beta_1)\cdot X(f/f_a-f/f_a-\beta_0-\beta_1\text{ mod }1).$$

The condition for the first order of the Volterra filter module 16 is $$Y(f/f_a)=H_{eq,1}(f/f_a)\cdot H_2(f/f_a)\cdot X(f/f_a)=X(f/f_a). \quad\text{(E.60)}$$

This immediately yields the following result for an arbitrary input signal spectrum $X(f/f_a)$:

$$H_{eq,1}(f/f_a)=\frac{1}{H_1(f/f_a)} \quad\text{(E. 61)}$$

The condition for the second order of the Volterra filter module 16 is $$\sum_{\mu=0}^{N-1}H_{eq,2}(\mu,f/f_a-\mu\text{ mod }1)\cdot X(\mu)\cdot X(f/f_a-\mu\text{ mod }1)= \quad\text{(E. 62)}$$

$$-H_{eq,1}(f/f_a)\cdot\sum_{\alpha=0}^{N-1}H_2(\alpha,f/f_a-\alpha\text{ mod }1)\cdot[H_{eq,1}(\alpha)\cdot$$

$$X(\alpha)]\cdot[H_{eq,1}(f/f_a-\alpha\text{ mod }1)\cdot X(f/f_a-\alpha\text{ mod }1)].$$

This yields the following result:

$$H_{eq,2}(f_0/f_a,f_1/f_a)=-H_{eq,1}(f_0/f_a+f_1/f_a\text{ mod }1)\cdot \quad\text{(E. 63)}$$

$$H_2(f_0/f_a,/f_1/f_a)\cdot H_{eq,1}(f_0/f_a)\cdot H_{eq,1}(f_1/f_a).$$

For the third order of the Volterra filter module 16, the frequency-domain analogues of the terms given in equation (E.55) are determined. The result is $$T_{(1)}=-H_{eq,1}(f/f_a)\cdot \quad\text{(E. 64)}$$

$$\sum_{\beta_0=0}^{N-1}\sum_{\beta_1=0}^{N-1}H_3(\beta_0,\beta_1,f/f_a-\beta_0-\beta_1\text{ mod }1)\cdot[H_{eq,1}(\beta_0)\cdot$$

$$X(\beta_0)]\cdot[H_{eq,1}(\beta_1)\cdot X(\beta_1)]\cdot[H_{eq,1}(f/f_a-\beta_0-\beta_1\text{ mod }1)\cdot$$

$$X(f/f_a-\beta_0-\beta_1\text{ mod }1)],$$

$$T_2=-\sum_{\alpha=0}^{N-1}H_{eq,2}(a,f/f_a-\alpha)\cdot[X(\alpha)+$$

$$T_{(5)}(\alpha)]\cdot[X(f/f_a-\alpha\text{ mod }1)+T_{(6)}(f/f_a-a\text{ mod }1)]$$

$$T_{(5)}(\alpha)=\sum_{\beta=0}^{N-1}H_{eq,2}(\beta,\alpha-\beta\text{ mod }1)\cdot[H_{eq,1}(\beta)\cdot X(\beta)]\cdot$$

$$H_{eq,1}(\alpha-\beta\text{ mod }1)\cdot X(\alpha-\beta\text{ mod }1)$$

$$T_{(6)}(f/f_a-\alpha\text{ mod }1)=\sum_{\beta=0}^{N-1}H_{eq,2}(\beta,f/f_a-\alpha-\beta\text{ mod }1)\cdot[H_{eq,1}(\beta)\cdot$$

$$X(\beta)]\cdot[H_{eq,1}(f/f_a-\alpha-\beta\text{ mod }1)\cdot X(f/f_a-\alpha-\beta\text{ mod }1)]$$

-continued $$T_{(3)} = +\sum_{\alpha=0}^{N-1} H_{eq,2}(\alpha, f/f_a - \alpha) \cdot X(\alpha) \cdot X(f/f_a - \alpha)$$

$$T_{(4)} = +\sum_{\alpha=0}^{N-1} H_{eq,2}(\alpha, f/f_a - \alpha) \Biggl\{ \sum_{\beta_0=0}^{N-1} H_2(\beta_0, \alpha - \beta_0 \bmod 1) \cdot [H_{eq,1}(\beta_0) \cdot$$

$$X(\beta_0)] \cdot [H_{eq,1}(\alpha - \beta_0 \bmod 1) \cdot X(\alpha - \beta_0 \bmod 1)] \Biggr\} \cdot$$

$$\Biggl\{ \sum_{\beta_1=0}^{N-1} H_2(\beta_1, f/f_a - \alpha - \beta_1 \bmod 1) \cdot [H_{eq,1}(\beta_1) \cdot X(\beta_1)] \cdot [H_{eq,1}$$

$$(\beta_1, f/f_a - \alpha - \beta_1 \bmod 1) \cdot X(\beta_1, f/f_a - \alpha - \beta_1 \bmod 1)] \Biggr\}$$

For the calculation of the transfer function $H_{eq,3}$ of the third order of the Volterra filter module 16, only product spectra $X(f_0/f_a) \cdot X(f_1/f_a) \cdot X(f_2/f_a)$ with three frequencies may contribute. It has turned out that terms that do not meet this condition completely cancel each other.

Accordingly, it holds $$T_2 = -\sum_{\alpha=0}^{N-1} H_{eq,2}(\alpha, f/f_a - \alpha) \cdot T_{(5)} \cdot T_{(6)} = \quad (E. 65)$$

$$-T_{(4)} - \sum_{\alpha=0}^{N-1} H_{eq,2}(\alpha, f/f_a - \alpha) \cdot X(\alpha) \cdot X(f/f_a - \alpha) = -T_{(3)}.$$

The result for the third order transfer function of the Volterra filter module 16 has two contributions, namely $H_{eq,3}^{(1)}$ and $H_{eq,3}^{(2)}$, which are given by $$H_{eq,3}^{(1)}(f_0/f_a, f_1/f_a, f_2/f_a) = \quad (E. 66)$$

$$-H_{eq,1}(f_0/f_a + f_1/f_a + f_2/f_a \bmod 1) \cdot H_3(f_0/f_a, f_1/f_a, f_2/f_a) \cdot$$

$$H_{eq,1}(f_0/f_a) \cdot H_{eq,1}(f_1, /f_a) \cdot H_{eq,1}(f_2/f_a).$$

$$H_{eq,3}^{(2)}(f_0/f_a, f_1/f_a, f_2/f_a) =$$

$$-H_{eq,2}(f_0/f_a, +f_1/f_a + f_2/f_a \bmod 1) \cdot H_{eq,1}(f_1/f_a) \cdot H_{eq,1}(f_2/f_a) -$$

$$H_{eq,2}(f_1/f_a + f_2/f_a \bmod 1, f_0/f_a) \cdot H_{eq,2}(f_0/f_a, f_1/f_a) \cdot$$

$$H_{eq,2}(f_1/f_a, f_2/f_a) \cdot H_{eq,1}(f_1/f_a) \cdot H_{eq,1}(f_2/f_a).$$

The third order transfer function of the Volterra filter module 16 is then given by $$H_{eq,3}(f_0/f_a, f_1/f_a, f_2/f_a) = \quad (E. 67)$$

$$H_{eq,3}^{(1)}(f_0/f_a, f_1/f_a, f_2/f_a) + H_{eq,3}^{(2)}(f_0/f_a, f_1/f_a, f_2/f_a)$$

With the technique described in equations (E.59) to (E.67), reference transfer functions $H_{eq,ref,m}(f_0/f_a, \ldots, f_{m-1}/f_a)$ are determined in the frequency domain.

Alternatively, the reference transfer functions may be determined based on the reference impulse responses $h_{eq,ref,m}(k_0, k_1, k_2)$ by a Fourier transform.

The (final) filter coefficients $h_{eq,m}$ of the Volterra filter module 16 can then be determined by a minimum square technique as described in equations (E.38) to (E.47) applied to the reference transfer functions $H_{eq,ref,m}(f_0/f_a, \ldots, f_{m-1}/f_a)$.

Therein, a desired structure can be imposed on the filter coefficients $h_{eq,m}$, e.g. a memory polynomial structure, an extended memory polynomial structure, or otherwise pruned impulse responses.

With the spectral weighting function W, the spectral quality of the Volterra filter module 16 can be controlled. It has turned out that a particular high equalization accuracy for equalizing unwanted non-linear disturbances is achievable this way.

It is to be understood that while the method above is described in the context of the single non-linear electronic component 12 causing the non-linear distortions, the method can readily be applied to several non-linear electronic components and/or to a whole non-linear electronic system comprising several non-linear electronic components that are interconnected.

Accordingly, filter coefficients of the Volterra filter module 16 may be adapted such that the equalizer module 14 is configured to equalize the non-linear electronic system. In other words, the Volterra filter module 16 processes the output signal y of the non-linear electronic component 12, thereby generating an equalized output signal $y_{eq}$ that corresponds to the output signal y of the non-linear electronic component 12, but with the non-linear distortions removed.

Figure 4:
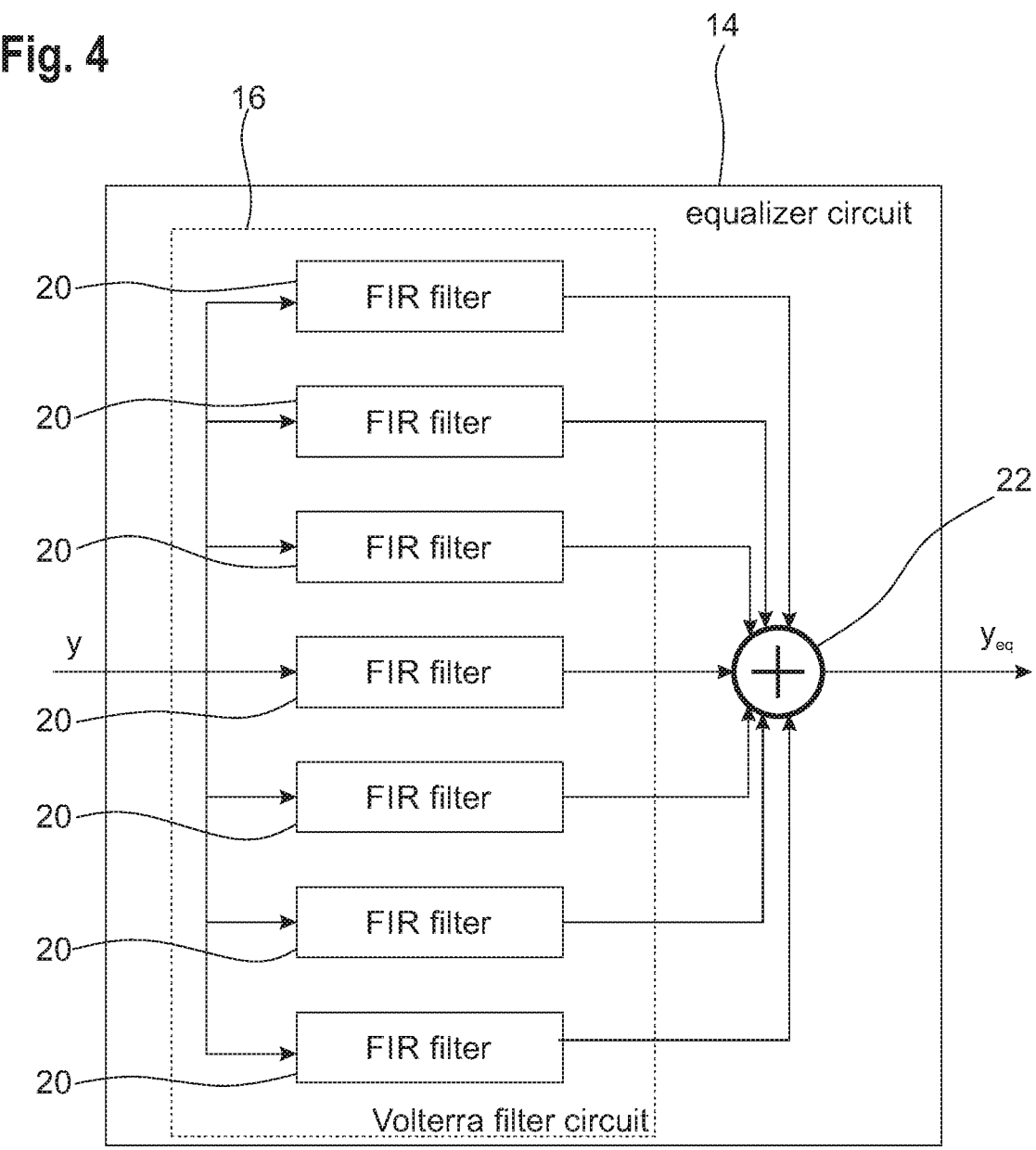
FIG. 4 schematically shows an implementation of an equalizer circuit or module according to an embodiment of the present disclosure.

FIG. 4 shows one possible implementation of the equalizer module 14 with the Volterra filter module 16. The equalizer module 14 is established as a digital filter circuit.

The Volterra filter module 16 comprises several short-length finite impulse response (FIR) filters 20 that are arranged in parallel. In some embodiments, the FIR filters 20 each are established in hardware. For example, the FIR filters 20 each may comprise FPGAs and/or ASICs.

Each of the short-length FIR filters 20 is configured to receive signal samples that are associated with the output signal y of the non-linear electronic component 12 (the output signal of the y of the non-linear electronic component 12 is the input signal of the equalizer module 14).

In the following, the output signal y of the non-linear electronic component is denoted as "filter input signal", and the equalized output signal $y_{eq}$ is denoted as "filter output signal".

Each short-length FIR filter 20 receives a product of at least two filter input signal samples, i.e. the filter input signal associated with each short-length FIR filter 20 comprises a product of at least two filter input signal samples, i.e. a product $$x(t_0/T_a - 0, \ldots, t_0/T_a - \mu_{m-1}) = \prod_{\alpha=0}^{m-1} x(t_0/T_a - \mu_\alpha). \quad (E. 68)$$

The short-length FIR filters 20 are each configured to determine one term of the second Volterra series as defined in equation (E.1) or (E.14), but with the impulse responses h being replaced by the determined filter coefficients $h_{eq}$.

Therein, different FIR filters 20 are associated with different diagonals of the second Volterra series.

In general, the number of necessary FIR filters 20 depends on the maximum order M of the second Volterra series and on the number of non-zero diagonals of the second Volterra series.

As already explained above, the maximum order of the second Volterra series is M=3.

For example, the second Volterra series may comprise $D_2=D_3=2$ non-zero diagonals. In this case, one FIR filter 20 is necessary for determining the first order (m=1) term of the second Volterra series. Two FIR filters 20 are necessary for determining the second order (m=2) term of the second Volterra series. Four FIR filters 20 are necessary for determining the third order (m=3) term of the third order Volterra series. Thus, in the particular example shown in FIG. 4, the Volterra filter module 16 comprises seven FIR filters 20.

Each FIR filters 20 determines one term of the second Volterra series based on the filter input signal y and based on the filter coefficients $h_{eq}$. Thus, the output signal of each FIR filter 20 is associated with one term of the second Volterra series, i.e., with a certain diagonal of the second Volterra series. The output signals of all FIR filters 20 are summed by a summation circuit 22, thereby generating the equalized output signal $y_{eq}$.

It has turned out that product signals as defined in equation (E.68) can be processed in a particularly resource-efficient manner by means of short-length FIR filters. Thus, the present disclosure provides a particularly resource-efficient equalizer module for equalizing non-linear systems.

In some embodiments, it has turned out that the equalizer module 14 described above is capable of equalizing the filter input signal y in real time, even at high sample rates up to several 10 GHz.

However, the equalizer module 14 comprising the several short-length FIR filters 20 is not restricted to the particular use for implementing a Volterra filter.

Figure 5:
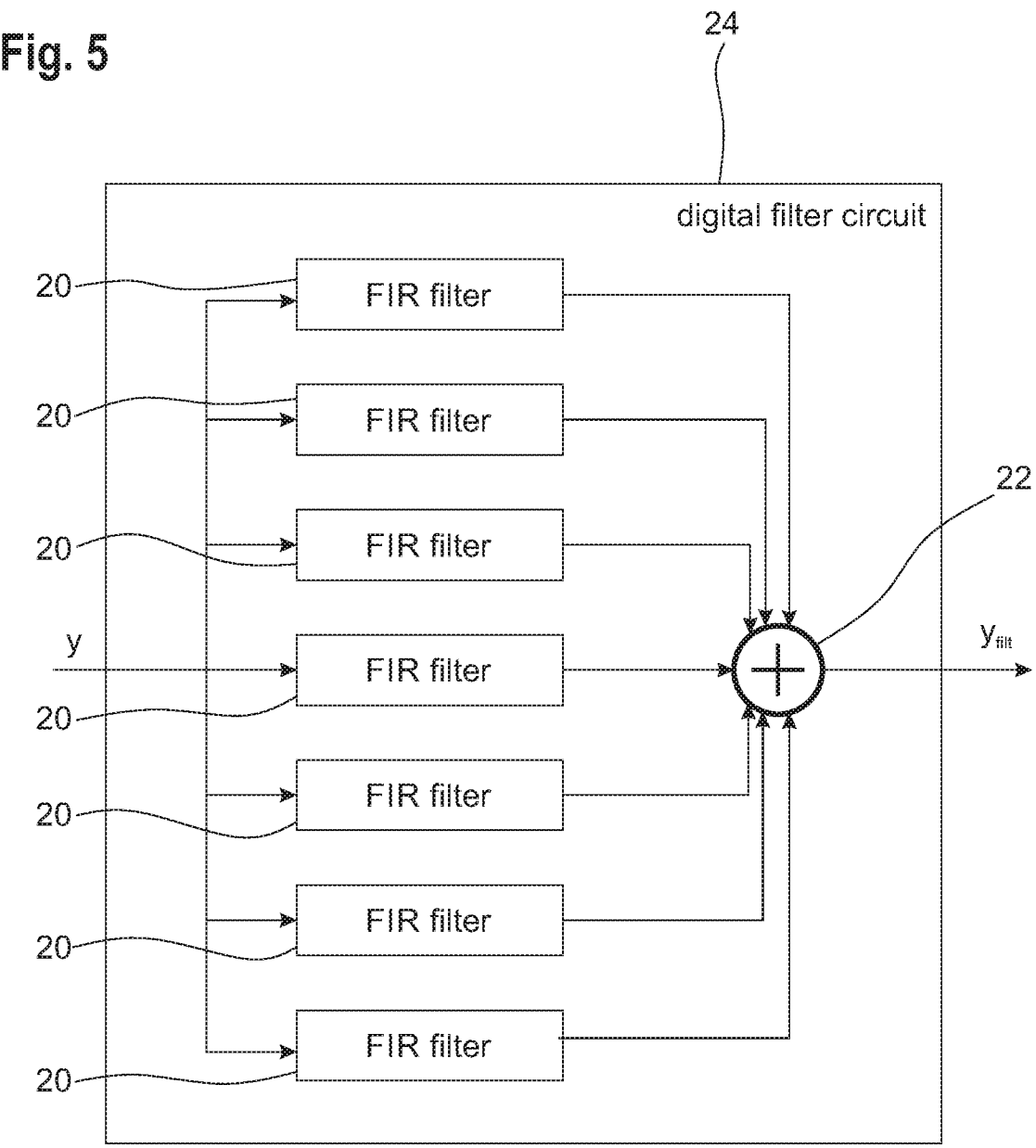
FIG. 5 schematically shows a digital filter circuit according to an embodiment of the present disclosure.

FIG. 5 shows a digital filter circuit 24. Similarly to the equalizer module 14 described above, the digital filter circuit 24 comprises several short-length FIR filters 20 that are arranged in parallel.

The digital filter circuit is configured to process the filter input signal y, thereby generating a filter output signal $y_{filt}$, wherein the filter input signal comprises a product of input signal samples as described in equation (E.68).

Thus, the filter input signal y is established as a product signal, i.e., the filter input signal y comprises the product of at least two input signal samples. Therein, the two input signal samples may be taken at the same time or at different times.

The filter input signal y may comprise a set of products of input signal samples. In general, the set of products may comprise different products, i.e., products of input signal samples taken at different times and/or with different numbers of factors. The different products may all be forwarded to a single short-length FIR filter 20 or to different short-length FIR filters 20 for further processing.

The output signals of the individual FIR filters 20 are summed by the summation circuit 22, thereby generating the filtered output signal $y_{filt}$.

Certain embodiments disclosed herein, for example the respective module(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A digital filter circuit, the digital filter circuit comprising at least one signal input and at least one finite impulse response (FIR) filter associated with the at least one signal input, the at least one signal input being configured to receive an input signal, wherein the input signal is a product signal $x(t_0/T_a, \ldots, t_{m-1}/T_a)$, wherein the input signal comprises a product of at least two input signal samples, $x(t_\alpha/T_a)$, in a manner that the input signal is given by $x(t_0/T_a, \ldots, t_{m-1}/T_a) = \Pi_{\alpha=0}^{m-1}(t_\alpha/T_a)$, wherein m is an integer greater than or equal to 2, wherein $T_a$ is a sampling time associated with the input signal, wherein the at least two input signal samples $x(t_\alpha/T_a)$ are taken at the same time or at different times $t_\alpha$, and the at least one FIR filter being established as a short-length FIR filter, wherein multiplications are replaced by decimated sub-filters in the short-length FIR filter.

2. The digital filter circuit of claim 1, wherein the input signal comprises a set of products of input signal samples.

3. The digital filter circuit of claim 1, wherein the product of the at least two input signal samples corresponds to a Volterra series diagonal.

4. The digital filter circuit of claim 1, wherein the digital filter circuit comprises several FIR filters and several signal inputs,
   each signal input being configured to receive a respective input signal comprising a product of at least two input signal samples, and
   each FIR filter being established as a short-length FIR filter.

5. The digital filter circuit of claim 4, wherein each input signal comprises a product of input signal samples corresponding to a different Volterra series diagonal, wherein each Volterra series diagonal is associated with a term of a Volterra series.

6. The digital filter circuit of claim 5, wherein a number of the FIR filters depends on at least one of a number of diagonals of the Volterra series and a maximum order of the Volterra series.

7. The digital filter circuit of claim 5, wherein the digital filter circuit comprises one FIR filter for a first order term of the Volterra series, or wherein the digital filter circuit comprises two FIR filters for a second order term of the Volterra series.

8. The digital filter circuit of claim 5, wherein the digital filter circuit comprises four FIR filters for a third order term of the Volterra series.

9. The digital filter circuit of claim 5, wherein the digital filter circuit comprises a summation circuit, the summation circuit being configured to sum output signals of the FIR filters.

10. The digital filter circuit of claim 1, wherein the at least one FIR filter comprises at least one of a field programmable gate array (FPGA) or an application specific integrated circuit (ASIC).

11. The digital filter circuit of claim 1, wherein filter coefficients of the at least one FIR filter are established in a manner that the at least one FIR filter is configured to equalize a non-linear electronic system.

12. A signal processing method for processing a digital input signal, the method comprising:
   receiving at least one digital input signal, wherein the at least one digital input signal is a product signal $x(t_0/T_a, \ldots, t_{m-1}/T_a)$, wherein the at least one digital input signal comprises a product of at least two input signal samples $x(t_\alpha/T_a)$, in a manner that the at least one digital input signal is given by $x(t_0/T_a, \ldots, t_{m-1}/T_a) = \Pi_{\alpha=0}^{m-1} x(t_\alpha/T_a)$, wherein m is an integer greater than or equal to 2, wherein $T_a$ is a sampling time associated with the at least one digital input signal, wherein the at least two input signal samples $x(t_\alpha/T_a)$ are taken at the same time or at different times $t_\alpha$;
   processing the at least one digital input signal by at least one finite impulse response (FIR) filter to obtain an output signal,
   wherein the at least one FIR filter is established as a short-length FIR filter, and wherein multiplications are replaced by decimated sub-filters in the short length FIR filter.

13. The method of claim 12, wherein the at least one digital input signal comprises a set of products of input signal samples.

14. The method of claim 12, wherein the product of at least two input signal samples corresponds to a Volterra series diagonal.

15. The method of claim 12, wherein the at least one digital input signal is processed by a Volterra filter circuit, wherein the Volterra filter circuit comprises the at least one FIR filter.

16. The method of claim 12, wherein several input signals are received and processed by several FIR filters, wherein each input signal comprises a product of at least two input signal samples, and wherein each FIR filter is established as a short-length FIR filter.

17. The method of claim 16, wherein output signals of the several Filters are summed in order to obtain the output signal.

18. The method of claim 16, wherein each input signal comprises a product of input signal samples corresponding to a different Volterra series diagonal.

19. The method of claim 16, wherein the at least one digital input signal corresponding to a first order of the Volterra series is processed by means of one FIR filter, the input signals corresponding to a second order of the Volterra series are processed by two FIR filters, and/or the input signals corresponding to a third order of the Volterra series are processed by four FIR filters.

20. The method of claim 12, wherein the at least one FIR filter comprises at least one of a field programmable gate array (FPGA) or an application specific integrated circuit (ASIC).

* * * * *